United States Patent
Kisletsov et al.

(10) Patent No.: US 7,521,655 B2
(45) Date of Patent: Apr. 21, 2009

(54) METHOD AND SYSTEM OF AUTOMATIC CONTROL

(75) Inventors: Alexander Vasilyevich Kisletsov, Samara (RU); Peter Nikolaevich Sygurov, Kinel (RU); Vladimir Vasilyevich Butuzov, Samara (RU); Sergey Dmitrievich Velikanov, Sarov (RU)

(73) Assignee: Zakrytoe Aktsionernoye obschestvo "STIVIT" (RU) (RU)

( * ) Notice: Subject to any disclaimer, the term of this patent is extended or adjusted under 35 U.S.C. 154(b) by 255 days.

(21) Appl. No.: 10/578,601

(22) PCT Filed: Mar. 17, 2004

(86) PCT No.: PCT/RU2004/000103

§ 371 (c)(1),
(2), (4) Date: May 8, 2006

(87) PCT Pub. No.: WO2005/057122

PCT Pub. Date: Jun. 23, 2005

(65) Prior Publication Data

US 2007/0090228 A1    Apr. 26, 2007

(30) Foreign Application Priority Data

Dec. 10, 2003  (RU) .............................. 2003135770

(51) Int. Cl.
*F41H 11/02* (2006.01)
*H04K 3/00* (2006.01)
*G01S 7/495* (2006.01)
*F41G 7/00* (2006.01)
*G01S 7/00* (2006.01)

(52) U.S. Cl. ...................... 244/3.1; 244/3.15; 244/3.16; 342/13; 342/14; 455/1; 89/1.11

(58) Field of Classification Search ........... 244/3.1–3.3; 89/1.11; 455/1; 342/13–16, 52, 54, 61, 67, 342/175, 195; 356/138, 139.04, 139.07, 356/139.08, 140, 141.2, 141.4; 701/1, 3
See application file for complete search history.

(56) References Cited

U.S. PATENT DOCUMENTS 4,231,533 A * 11/1980 Durig ........................ 244/3.16

(Continued)

FOREIGN PATENT DOCUMENTS

FR            2318453 A1 *  2/1977

(Continued)

*Primary Examiner*—Bernarr E Gregory
(74) *Attorney, Agent, or Firm*—Notaro & Michalos P.C.

(57) ABSTRACT

A method and apparatus for protecting a civil aircraft from missiles with infrared seeker heads includes detecting a launch of a missile from a location of launch, the missile having an infrared seeker head with an infrared sensitivity range, a power and an operation frequency, continuously determining instantaneous coordinates of the missile in flight after the launch and generating pulsed laser radiation. A wavelength range of the pulsed laser radiation is within the sensitivity range of the infrared seeker head, a power of the pulsed laser radiation exceeds the power of radiation of the aircraft engine in the sensitivity range of the infrared seeker head and a pulse repetition frequency of the pulsed laser radiation is at about the operation frequency of the infrared seeker head. The method includes sending the pulsed laser radiation to the instantaneous coordinates of the missile in flight.

9 Claims, 1 Drawing Sheet

U.S. PATENT DOCUMENTS

| | | | | |
|---|---|---|---|---|
| 5,600,434 A | * | 2/1997 | Warm et al. | 89/1.11 |
| 5,742,384 A | * | 4/1998 | Farmer | 356/141.4 |
| 6,873,893 B1 | * | 3/2005 | Sanghera et al. | 701/49 |
| 6,929,214 B2 | * | 8/2005 | Ackleson et al. | 342/13 |

FOREIGN PATENT DOCUMENTS

| | | | |
|---|---|---|---|
| FR | 2689252 A1 | * | 10/1993 |
| GB | 2337172 A | * | 11/1999 |
| GB | 2386015 A | * | 9/2003 |

* cited by examiner

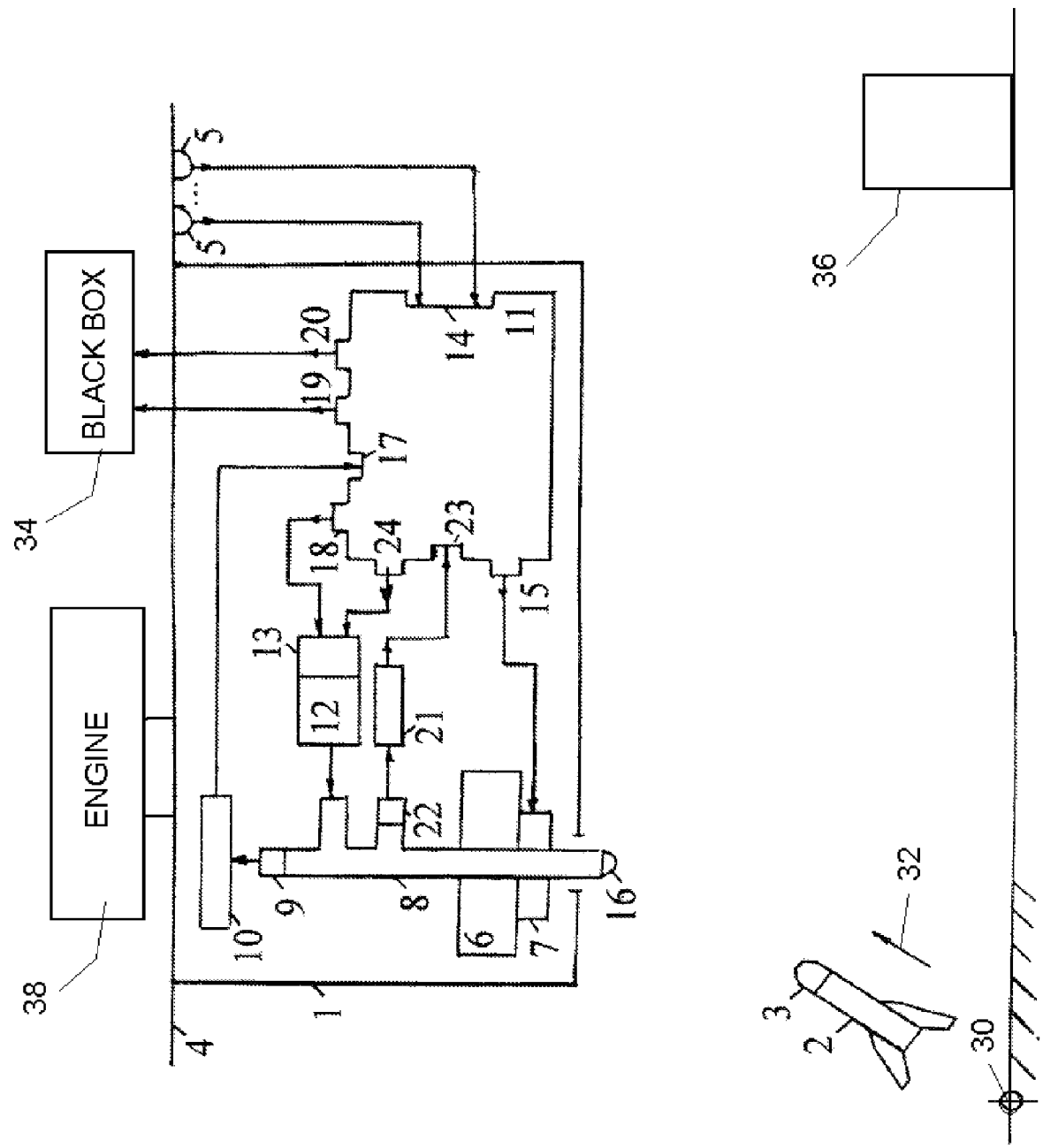

METHOD AND SYSTEM OF AUTOMATIC CONTROL

FIELD OF THE INVENTION

This invention relates to aircraft automatic control systems. The field of employment of present inventions is to provide flight safety of civil aircrafts.

BACKGROUND OF THE INVENTION

In practice, various techniques are employed in order to solve the problem for providing flight safety of civil aircrafts from missile attacks:

1. The "elimination of missile launch place", where a locality is guarded and patrolled. However, this technique required great resources and could not guarantee the flight safety because of great area of "risk zone" (zone from which there is a possibility to hit a flying aircraft).

2. The "lowering trail temperature" technique is not effective. Missiles having infrared (IR) seeker heads react to heat energy and are guided to a jet aircraft because of high temperature of its engine and exhaust gases. It is possible to decrease a little an IR heat trail by means of pumping air additionally around an engine exhaust, which could decrease its temperature a little. But even such lowering is very ineffective protection means from modern missiles that find their targets in the case of low temperature of engine.

3. The "strengthening aircraft" technique is restricted in practice use. An exact place of missile hit into an aircraft is unpredictable. Weight and cost of modernization being expected in the case of mounting armour onto a whole aircraft are ultimately high. But when mounting armour only onto critical aircraft assemblies (such as engines, fuel tanks, cockpit, and electronics units), the most part of aircraft will remain still vulnerable for a missile.

4. The "false targets—flashes" technique could "muddle" a missile guiding device. It should be noted that such targets are expensive and danger. On launching they catch fire and discharge a great amount of IR energy, which could "guide a missile to a false trail". However, pyrotechnic targets could provoke a fire, if they fall down onto the earth prior to be burned out completely.

There are other techniques to protect civil aircrafts from missile with infrared self-guided heads of portable anti-aircraft missile complexes. (See, for example, GB 2309290 A, 23 Jul. 1997; U.S. Pat. No. 5,249,527 A, 5 Oct. 1993; FR 2694804 A1, 18 Feb. 1994; DE 3835887A1, 3 May 1990). The most prospective among them are based on creating special radiation in a range of frequencies corresponding operation frequencies of systems that guide missiles to air targets. The purpose of such actions is often to wreck the process of guiding an infrared seeker head to an aircraft.

The closest in technical essence to the claimed method is a method for protecting aircrafts from missiles provided with seeker heads (see the Russian patent No. 2141094, 17 Aug. 1998). In accordance with said known method, a holographic image of real source radiating electromagnetic waves preferably in the range of visible and infrared spectrum is formed in the space between an aircraft and the most probable direction of possible enemy missile attack. Sources radiating electromagnetic waves at other frequencies corresponding to operating frequencies of various systems for guiding missiles to air targets could also be used as a false target.

However, a state of space between an aircraft and the most probable direction of possible enemy missile attack depends in a great degree on weather condition. This is the reason that prevents to obtain a holographic image of such a quality that would ensure a high reliability of protection in optical interference conditions.

The closest in technical essence to the claimed system is a system of aircraft protection from missile provided with seeker heads, which is intended to perform the aforementioned known method (see the above Russian patent No. 2141094).

The unstable state of space between an aircraft and the most probable direction of possible enemy missile attack, which depends in a great degree on weather conditions, could be again indicated as the reason preventing to obtain a holographic image of such a quality that would ensure a high reliability of protection in optical interference conditions.

At the present time, the probability of using portable anti-aircraft missile complexes against a civil aircraft by terrorists is rather great. The portable anti-aircraft missile complexes employing missiles with infrared seeker heads are simple in use, requires minimal skill in treatment, and are set ready for action in less than three minutes. They are spread widely. There are approximately 500000 units of indicated complexes in the world. And although their most part are under a control of responsible state bodies, these complexes are still available at the black arm market at the price of several tens of thousands of USD. At the present time, portable anti-aircraft missile complexes employing missiles with infrared seeker heads are considered to take a part in an arsenal of some 27 terrorist and underground alignments. Moreover, this armour uses missiles, i.e., air vessels. An action range of many models of this arm is more than 6 km, and using this arm it is possible to hit an aircraft flying at a height of more than 3 km. Hence, a civil aircraft, when flying up or landing, is under the threat of attack from an area of several hundred square kilometers. Thus, the problem of protecting civil aircrafts from the aforementioned arm is of extreme actuality at the present.

SUMMARY OF THE INVENTION

Therefore, the object of the claimed invention is to reduce a probability of a missile hit to a civil aircraft and to ensure protection reliability in optical interference environment.

This problem is solved in a method for protecting a civil aircraft from missiles with seeker heads of portable anti-aircraft missile complexes in accordance with the present invention, the method comprising steps of: determining the fact of a missile launch; determining missile coordinates in every time moment; generating pulse periodic laser radiation, wherein a wavelength range of the laser radiation being within a sensitivity range of infrared seeker head, a power of the laser radiation exceeding the power of radiation of the aircraft engine in the sensitivity range of the infrared seeker head, and a pulse repetition frequency being close to typical operation frequencies of the infrared seeker heads; and sending the laser radiation to the point of presence of the missile in the given time moment.

An additional distinction of the method according to the present invention further comprises steps of: calculating coordinates of missile launch place; transmitting an information on the fact of the missile launch and on the coordinates of missile launch place to the earth safety flight providing system and aircraft objective control system.

One more distinction of the method according to the present invention further comprises steps of: receiving the laser radiation reflected from the infrared seeker head; defining, by the power level of this reflected laser radiation, the fact that the aircraft is attacked by a missile with just the infrared seeker head; defining, on lowering the power level of this reflected laser radiation, the fact of failure of guiding the infrared seeker head to the aircraft; thereafter, terminating the generation of the laser radiation; and transmitting the information on the fact of failure of guiding the missile to the earth safety flight providing system and aircraft objective control system.

The same problem is solved in a system for protecting a civil aircraft from missiles with seeker heads of portable anti-aircraft missile complexes in accordance with the present invention, the system comprising on board the civil aircraft being protected: sensors of the fact and coordinates of missile launch; a transceiver having a turn drive and an optical channel which output is connected to a sensor of missile coordinates at a missile flight trajectory; an on-board calculator; and a laser radiation generator having an actuation device, wherein the laser radiation generator being made of fluorine-hydrogen-deuterium type, the on-board calculator being configured to process signals from the sensors of the fact and coordinates of missile launch for calculating coordinates of a missile launch place and for providing a control signal to the turn drive of the transceiver in order for an optical channel of the transceiver to be directed to the launched missile, as well as to process signals from the sensor of missile coordinates at a missile flight trajectory for calculating missile coordinates in the given time moment and for providing an actuating signal to the actuation device of the laser radiation generator.

An additional distinction of the system according to the present invention is in that the on-board calculator is configured to transmit the information on the fact of the missile launch and on the coordinates of missile launch place to the earth safety flight providing system and aircraft objective control system.

Once more distinction of the system according to the present invention is in that the system further comprises a reflected laser radiation receiver connected to an additional output of the optical channel of transceiver and intended for providing signals to the on-board calculator which is further configured to define, by the power level of this reflected laser radiation, the fact that the aircraft being attacked by a missile with just the infrared seeker head, and to define, on lowering the power level of this reflected laser radiation, the fact of failure of guiding the infrared seeker head to the aircraft; to provide to the actuation device of the laser radiation generator an actuating signal which terminates the generation of the laser radiation, and to transmit the information on the fact of failure of guiding the missile to the earth safety flight providing system and aircraft objective control system.

One more distinction of the system according to the present invention is in that the sensors of the fact and coordinates of missile launch are sensors of the ultraviolet range.

Yet one more distinction of the system according to the present invention is in that the sensor of missile coordinates at a missile flight trajectory is a narrow-directed sensor of the ultraviolet range.

Finally, one more distinction of the system according to the present invention is in that the optical channel of the transceiver is further intended to transmit the radiation of the laser radiation generator towards the launched missile.

BRIEF DESCRIPTION OF DRAWINGS

The claimed invention is illustrated further with references to the accompanying drawing, where identical units and elements have the same numbers.

DETAILED DESCRIPTION OF PREFERRED EMBODIMENTS

The drawing shows schematically a situation of protecting a civil aircraft from missiles with seeker heads of portable anti-aircraft missile complexes and a structure of system for protecting a civil aircraft from missiles with seeker heads of portable anti-aircraft missile complexes.

The system 1 for protecting a civil aircraft 4 (see the drawing) from missiles 2 with infrared seeker heads 3 of portable anti-aircraft missile complexes comprises, on board the civil aircraft 4 being protected: launch sensors 5 for sensing the launch of, and launch coordinates 30 for, the missile launch; a transceiver 6 having a turn drive 7 and an optical channel 8 which output 9 is connected to a sensor coordinate 10 for continuously sensing the instantaneous missile coordinates during the missle's flight on a missile flight trajectory 32; an on-board calculator 11; and a laser radiation generator 12 having an actuation device 13. The first group of inputs 14 of the on-board calculator 11 are connected to the outputs of sensors 5 in order to calculate the launch location coordinates 30 and the occurrence of the missile launch. The first output 15 of the on-board calculator 11 is connected to the turn drive 7 of the transceiver 6 in order to direct an input 16 of the optical channel 8 of the transceiver 6 to the launched missile 2. The output of the sensor 10 of instantaneous missile coordinates of a missile flight trajectory 32 is connected to the second input 17 of the on-board calculator 11. The second output 18 of the on-board calculator 11 is connected to the actuation device 13 of the laser radiation generator 12. The aircraft 4 also has at least one engine 38 that radiates infrared power at a certain level.

It is desirable to provide the on-board calculator 11 with the third 19 and fourth 20 outputs coupled with the aircraft objective control system 34 ("black boxes" or flight recorders) and the aircraft system for communicating with the earth safety flight providing services 36, respectively, in order to transmit the information on the fact of the missile launch and on the launch coordinates of missile launch to the aircraft objective control system 34 and to the earth safety flight providing system 36.

It is desirable to provide the system 1 for protecting a civil aircraft 4 with a reflected laser radiation receiver 21 coupled with an additional output 22 of the optical channel 8 of the transceiver 6. The on-board calculator 11 is desirable to be made with a third output 23 coupled with the output of the reflected laser radiation receiver 21 in order further to define, by the power level of this laser radiation reflected from the seeker head 3 of the launched missile 2, the fact that the aircraft being attacked by a missile with just the infrared seeker head, and to define, on lowering the power level of this reflected laser radiation, the fact of failure of guiding the infrared seeker head to the aircraft. It is desirable to make the on-board calculator 11 with a fifth output 24 coupled with the actuation device 13 of the laser radiation generator 12 in order to provide a signal for terminating the generation of laser radiation to the actuation device 13 of the laser radiation generator 12.

It is desirable to connect the output of the laser radiation generator 12 with the optical channel 8 of the transceiver 6 in order to transmit the radiation of the laser radiation generator 12 towards the launched missile 2.

The method for protecting a civil aircraft from missiles with infrared seeker heads of portable anti-aircraft missile complexes in accordance with the present invention is realized in the presented system as follows.

A missile 2 with infrared seeker head 3 could be launched toward a civil aircraft 4 in the process of flying. The sensors 5 on the civil aircraft 4 being protected, sense the ultra-violet radiation of the engine of missile 2 being started. Signals from these sensors are fed to the first group of inputs 14 of the on-board calculator 11 for calculating the coordinates 30 of missile launch location. The information on the fact of this launch and coordinates of missile launch are transmitted from the on-board calculator 11 via its third 19 and fourth 20 outputs to the aircraft objective control system 34 ("black boxes" or flight recorders) and to the aircraft system for communicating with the earth safety flight providing systems 36. Moreover, the control signal corresponding to the coordinates of missile launch is transmitted via the first output 15 of the on-board calculator 11 to the turn drive 7 of the transceiver 6 in order to direct the input 16 of the optical channel 8 of the transceiver 6 toward the launched missile 2. Through this optical channel 8 the infrared radiation of the flying missile 2 comes to the sensor 10 of missile coordinates on the missile flight trajectory 32, which is a narrow-directed sensor of the infrared range, and as a result, an output signal of this sensor is formed. After processing the output signal of the sensor 10 in the on-board calculator 11, the instantaneous coordinates of the missile 2 at any given time are calculated.

The control signal corresponding to the coordinates of the missile 2 in the given time moment is transmitted via the first output 15 of the on-board calculator 11 to the turn drive 7 of the transceiver 6 in order to direct exactly the input 16 of the optical channel 8 of the transceiver 6 to the launched missile 2 (i.e., a precise guiding of the missile 2 at its trajectory is ensured by the system 1). Moreover, based on the result of processing the output signal of the sensor 10 of missile coordinates at a missile flight trajectory in the on-board calculator 11, an actuating signal is provided via the output 18 of the on-board calculator 11 to the activation device 13 of the laser radiation generator 12. The radiation from the laser radiation generator 12 is directed through the optical channel 8 of the transceiver 6 towards the launched missile 2. Since the laser radiation generator 12 is made of fluorine-hydrogen-deuterium type, then it forms a pulse periodic laser radiation having certain parameters: the laser radiation wavelength is within a sensitivity range of infrared seeker heads, and a power of laser radiation exceeds the power of radiation of the aircraft engine in the sensitivity range of the infrared seeker heads. A pulse repetition frequency is formed close to typical operation frequencies of the infrared seeker heads. As a result of laser radiation direct hit to the infrared seeker head 3 of the missile 2 a failure in guiding the missile to the aircraft occurs. The missile flies past (or misses) the aircraft, thereafter the laser radiation generation is terminated and the information on the fact of failure of guiding the missile is transmitted to the earth safety flight providing system and aircraft objective control system.

The additional equipment of the system 1 for protecting an aircraft with the reflected laser radiation receiver 21 connected to the additional output 22 of the optical channel 8 of the transceiver 6 and intended to provide signals to the on-board calculator 11 (which is further configured to define, by the power level of the laser radiation reflected from the seeker head of the launched missile, the fact that the aircraft being attacked by a missile with just the infrared seeker head, and to define, on lowering the power level of the reflected laser radiation, the fact of failure of guiding the infrared seeker head to the aircraft) allows to output to the activation device 13 of the laser radiation generator 12 the signal for terminating the laser radiation generation, and to transmit the information on the fact of failure of guiding the missile to the earth safety flight providing system and aircraft objective control system.

As the sensors of the fact and coordinates of missile launch could be used the ultraviolet sensors produced since 2002 by DaimlerChrisler Aerospace AG, and as the sensor of missile coordinates at a missile flight trajectory could be used the sensor produced since 2002 by Bodenseewerk Geratetechnik GmbH.

As the on-board calculator could be used the known computer Baget-83 produced in Russia since 1998. As the turn drive of the transceiver in order to direct the input of the optical channel, and as the reflected laser radiation receiver is employed the optical circuit, receivers and drives utilized in the lidar produced by SPI International Protopopov V.V., Ustinov N.D. Infrared laser finding systems.—Moscow: Army publishing house, 1987.—in Russian. As the laser radiation generator could be used the known wideband chemical laser "Quantum electronics", vol. 18, No. 2, 1991.—P. 186.—in Russian.

INDUSTRIAL APPLICABILITY

The present invention could be employed most successfully in the civil aviation.

The invention claimed is:
1. A method for protecting a civil aircraft from missiles with infrared seeker heads of portable anti-aircraft missile complexes, the aircraft having an engine with a level of radiation power, the method comprising the steps of:
   detecting a launch of a missile from a location of launch, the missile having an infrared seeker head with an infrared sensitivity range, a power and an operation frequency;
   continuously determining instantaneous coordinates of the missile in flight after the launch;
   generating pulsed laser radiation, wherein a wavelength range of the pulsed laser radiation is within the sensitivity range of the infrared seeker head, a power of the pulsed laser radiation exceeding the power of radiation of the aircraft engine in the sensitivity range of the infrared seeker head, and a pulse repetition frequency of the pulsed laser radiation being at about the operation frequency of the infrared seeker head; and
   sending the pulsed laser radiation to the instantaneous coordinates of the missile in flight.

2. The method according to claim 1, further comprising the steps of:
   calculating launch coordinates of the missile at the location of launch;
   transmitting information on the occurrence of the launch and on the launch coordinates to an earth safety flight providing system and an on-board aircraft objective control system.

3. The method according to claim 1, further comprising the steps of:
   receiving laser radiation reflected from the infrared seeker head;
   determining, by a power level of the reflected laser radiation, that the aircraft is being attacked by the missile with the infrared seeker head;
   determining, by a lowering of the power level of the reflected laser radiation, a failure of guiding of the infrared seeker head to the aircraft;
   thereafter, terminating the generation of the laser radiation; and transmitting information on the failure of guiding the missile to an earth safety flight providing system and an on-board aircraft objective control system.

4. A system for protecting a civil aircraft from missiles with infrared seeker heads of portable anti-aircraft missile complexes, the system comprising, on board the civil aircraft being protected:

launch sensors for detecting a launch of a missile from a location of launch, the missile having an infrared seeker head with an infrared sensitivity range, a power and an operation frequency;

a coordinate sensor for sensing instantaneous coordinates of the missile in flight after the launch;

a transceiver having a turn drive and an optical channel with an output connected to the coordinate sensor;

an on-board calculator; and a laser radiation generator having an actuation device;

wherein the laser radiation generator is a fluorine-hydrogen-deuterium laser radiation generator, the on-board calculator processing signals from the launch sensors for calculating launch coordinates of the missile launch location and for providing a control signal to the turn drive of the transceiver in order for an optical channel of the transceiver to be directed to the launched missile, as well as to process signals from the coordinate sensor for calculating the instantaneous missile coordinates and for providing an actuating signal to the actuation device of the laser radiation generator.

5. The system according to claim 4, wherein the on-board calculator transmits information on the occurrence of the missile launch and on the launch coordinates to an earth safety flight providing system and an on-board aircraft objective control system.

6. The system according to claim 4, further comprising a reflected laser radiation receiver connected to an additional output of the optical channel of the transceiver for providing signals to the on-board calculator which determines, by a power level of the reflected laser radiation, that the aircraft is being attacked by a missile with the infrared seeker head, and to determine, on lowering of the power level of the reflected laser radiation, a failure of guiding of the infrared seeker head to the aircraft; to provide to the actuation device of the laser radiation generator an actuating signal which terminates the generation of the laser radiation, and to transmit information on the failure of guiding of the missile to the earth safety flight providing system and aircraft objective control system.

7. The system according to claim 4, wherein the launch sensors are sensors of ultraviolet radiation.

8. The system according to claim 4, wherein the coordinate sensor is a narrow-directed sensor of ultraviolet radiation.

9. The system according to claim 4, wherein the optical channel of the transceiver further transmits the radiation of the laser radiation generator towards the launched missile.

* * * * *

UNITED STATES PATENT AND TRADEMARK OFFICE
CERTIFICATE OF CORRECTION

| | |
|---|---|
| PATENT NO. | : 7,521,655 B2 |
| APPLICATION NO. | : 10/578601 |
| DATED | : April 21, 2009 |
| INVENTOR(S) | : Alexander Vasilyevich Kisletsov et al. |

It is certified that error appears in the above-identified patent and that said Letters Patent is hereby corrected as shown below:

On the Title Pg, Item (73) should read as follows:

(73) Assignee: Zakrytoe Aktsionernoye obschestvo "STIVT" (RU)

Signed and Sealed this

Thirtieth Day of June, 2009

JOHN DOLL
*Acting Director of the United States Patent and Trademark Office*